US012572130B1

(12) United States Patent
Liu

(10) Patent No.: US 12,572,130 B1
(45) Date of Patent: Mar. 10, 2026

(54) METHOD FOR GENERATING THREE-DIMENSIONAL PRINTING COMPOSITE HOLLOW STRUCTURE BASED ON ALTERNATING CONNECTIONS OF SPATIAL CURVES

(71) Applicant: Chang Liu, Hefei (CN)

(72) Inventor: Chang Liu, Hefei (CN)

( * ) Notice: Subject to any disclaimer, the term of this patent is extended or adjusted under 35 U.S.C. 154(b) by 0 days.

(21) Appl. No.: 19/220,806

(22) Filed: May 28, 2025

(30) Foreign Application Priority Data

Apr. 30, 2025 (CN) .......................... 202510571421.8

(51) Int. Cl.
| | |
|---|---|
| *G05B 19/4099* | (2006.01) |
| *B29C 64/386* | (2017.01) |
| *B29K 67/00* | (2006.01) |
| *B29K 75/00* | (2006.01) |
| *B33Y 10/00* | (2015.01) |
| *B33Y 50/00* | (2015.01) |

(52) U.S. Cl.
CPC ........ *G05B 19/4099* (2013.01); *B29C 64/386* (2017.08); *B33Y 10/00* (2014.12); *B33Y 50/00* (2014.12); *B29K 2067/046* (2013.01); *B29K 2075/00* (2013.01); *G05B 2219/49023* (2013.01)

(58) Field of Classification Search
CPC ...... G05B 19/4099; G05B 2219/49023; B33Y 10/00; B33Y 50/00; B29C 64/386; B29K 2067/046; B29K 2075/00
See application file for complete search history.

(56) References Cited

U.S. PATENT DOCUMENTS

| | | | |
|---|---|---|---|
| 2014/0255647 A1* | 9/2014 | Johnson ................. | B33Y 80/00 |
| | | | 428/116 |
| 2017/0150907 A1* | 6/2017 | Duffy ................... | A61B 5/7435 |
| 2020/0130256 A1* | 4/2020 | Debora ...................... | B32B 3/02 |
| 2021/0205099 A1* | 7/2021 | Parr ....................... | A61B 34/10 |
| 2023/0030783 A1* | 2/2023 | Urick ................. | G05B 19/4099 |
| 2023/0219158 A1* | 7/2023 | Cui ...................... | B23K 9/0953 |
| 2024/0001615 A1* | 1/2024 | Abergil .................. | B22F 10/18 |

\* cited by examiner

*Primary Examiner* — Robert E Fennema
*Assistant Examiner* — Yvonne Trang Follansbee
(74) *Attorney, Agent, or Firm* — Hemisphere Law, PLLC

(57) ABSTRACT

A method for generating a three-dimensional printing composite hollow structure based on alternating connections of spatial curves is provided, relating to the field of 3D printing technologies. In the method, a target 3D model is discretized into layers, and sections are extracted layer-by-layer. The sections are classified based on topological states of the respective sections. For a non-holed section, it can be divided into two parts as a contour 1 and a contour 2. For a single-holed section, it can be extracted as the contour 1 and the contour 2. A surface 1 for all the contours 1 is generated, and a surface 2 for all the contours 2 is generated. Spatial curves $f_i$ and $g_i$ are intersected with the contour 1 and the contour 2 at $P_{n,i}$ and $Q_{n,i}$ respectively. Differentiated textures are generated from a combination of K-lines and L-lines.

9 Claims, 14 Drawing Sheets n-th layer (n+1)-th layer

METHOD FOR GENERATING THREE-DIMENSIONAL PRINTING COMPOSITE HOLLOW STRUCTURE BASED ON ALTERNATING CONNECTIONS OF SPATIAL CURVES

TECHNICAL FIELD

The disclosure relates to the field of three-dimensional (3D) printing technologies, and more particularly to a method for generating a 3D printing composite hollow structure based on alternating connections of spatial curves.

BACKGROUND

A generation technology of 3D printing hollow structure represents one of core research directions in the field of additive manufacturing, aiming to reduce material consumption and enhance functionality while ensuring a structural strength. Generation methods in the related art for generating 3D printing hollow structures primarily rely on two techniques: a regular grid infilling method and a sectional contour offsetting method. The two methods are described in detail as follows.

(1) The regular grid infilling method employs/uses periodic geometric units such as honeycombs and grid patterns to fill internal spaces of a model. Although it can achieve lightweighting but suffers from monotonous textures and inability to dynamically adapt to surface features of the model, resulting in a low aesthetic value. Furthermore, it exhibits a strong symmetry between an inner structure and an outer structure, failing to meet differentiated functional requirements for scenarios like biomedical implants that demand distinct inner and outer surface properties.

(2) The sectional contour offsetting method generates infilling paths (e.g., concentric circles, spiral lines) by progressively offsetting model contours layer-by-layer. Although this method can improve printing efficiency, it suffers from poor path continuity, would easily lead to stress concentration, and it is difficult to accurately control surface texture morphology through mathematical parameters.

However, the above-mentioned methods for generating 3D printing hollow structures in the related art cannot simultaneously optimize the structural strength and aesthetic effects through single-parameter adjustments, identical algorithms for inner and outer contours would cause decorative surfaces and functional interiors unable to be collaboratively designed, and a random distribution of interlayer connection points can easily generate breakpoints and thereby reducing a success rate of printing and a structural integrity. Consequently, the method for generating 3D printing hollow structures in the related art would lead to problems such as monotonous textures, undifferentiated interior and exterior designs, and poor path continuities. In the related art, the method of generating infilling paths through sectional contours although can partially optimize the structure, there is a lack of dynamic control to surface textures, and it cannot realize complex aesthetic effects by parametric adjustments.

SUMMARY

Accordingly, the disclosure proposes a method for generating a 3D printing composite hollow structure based on alternating connections of spatial curves, which can achieve programmable texture design and mechanical performance optimization through mathematical parametrization of topological connection relationship between inner and outer contours.

The disclosure can be realized by using the following technical solutions.

In a first aspect, an embodiment of the disclosure provides a method for generating 3D printing composite hollow structure based on the alternating connections of the spatial curves, and the method includes the following steps (1) through (5).

(1) Model discretizing and sectional contour parsing, including: discretizing a target 3D model into layers along a printing direction and extracting sections layer-by-layer, assuming each of topological states of the sections of the respective layers is a non-holed state or a single-holed state, and processing by classification based on each of the topological states of the sections of the respective layers being the non-holed state or the single-holed state as follows:

for the section of the layer being a non-holed section, selecting two points on the section of the layer, and the two points dividing a single contour into two parts as a contour 1 and a contour 2;

for the section of the layer being a single-holed section, extracting an external boundary as the contour 2 and an internal hole boundary as the contour 1 to thereby form a nested structure.

(2) Spatial curve mapping, including: in a 3D space, generating a surface 1 constituted by F number of parameterized spatial curves $f_i$ for the contours 1 of all the layers, generating a surface 2 constituted by G number of parameterized spatial curves $g_i$ for the contours 2 of all the layers, each of the spatial curves $f_i$ intersecting the contour 1 of a n-th layer of the layers at a point $P_{n,i}$, and each of the spatial curves $g_i$ intersecting the contour 2 of the n-th layer at a point $Q_{n,i}$.

(3) K-L alternating connection path generation, including: generating K-lines in the n-th layer to connect intersection points on the contour 1 with intersection points on the contour 2 as per a preset offset, and generating L-lines in a (n+1)-th layer to connect intersection points on the contour 2 with intersection points on the contour 1 as per a second offset.

(4) Path optimizing and jointing, including: using a $K_a$ mode or a $K_b$ mode to generate a continuous printing path from the K-lines, and using a $L_a$ mode or a $L_b$ mode to generate another continuous printing path from the L-lines, thereby generating differentiated textures through a combination the K-lines and the L-lines.

(5) Parametric control and outputting, including: performing offset adjustment, spatial curve parameter adjustment and mode activation sequence adjustment, generating differentiated surface textures, and outputting 3D printing path codes.

In an embodiment, a geometric correspondence between the contour 1 and the contour 2 is determined by a contour division method and a point sampling method.

In an embodiment, the spatial curves $f_i$ and $g_i$ are continuous curves generated by parameterized functions, and the continuous curves include at least one kind of the following: B-spline curves, trigonometric function curves, Bezier curves, conic sections, and polylines.

In an embodiment, intersection points of the spatial curves with the contour 1 and the contour 2 of each of the layers are calculated and include the intersection points on the contour 1 of the n-th layer being $\{P_{n,i}\}$ and the intersection points on the contour 2 of the n-th layer being $\{Q_{n,i}\}$; the generating K-lines in the n-th layer includes connecting the point $P_{n,i}$ with a point $Q_{n,i+k}$, where k is the preset offset; and the generating L-lines in the (n+1)-th layer includes connecting a point $Q_{n+1,i+k}$ to a point $P_{n+1,i+1}$, where l is the second offset.

In an embodiment, a value of k satisfies a range of $1 \leq k \leq 10$, and a value of l satisfies a range of $1 \leq l \leq 10$, and the K-lines and the L-lines together form a cross-layer helical crossover network.

In an embodiment, the K-L alternating connection path generation, including:

generating the K-lines, including: in the n-th layer, connecting the point $P_{n,i}$ with the point $Q_{n,i+k}$, connecting a point $P_{n,i+1}$ with a point $Q_{n,i+k+1}$, and so on, to thereby generate the K-lines, where k is the preset offset $(1 \leq k \leq 10)$;

generating the L-lines, including: in the (n+1)-th layer, connecting the point $Q_{n+1,i+k}$ to the point $P_{n+1,i+1}$, connecting a point $Q_{n+1,i+k+1}$ to a point $P_{n+1,i+l+1}$, and so on, to thereby generate the L-lines, where l is the preset second offset $(1 \leq l \leq 10)$.

In an embodiment, a mode activation sequence for the K-lines and the L-lines is cyclically switched as per a preset rule, and during the using a $K_a$ mode or a $K_b$ mode to generate a continuous printing path from the K-lines:

the $K_a$ mode includes: connecting the point $P_{n,i}$ to the point $P_{n,i+1}$ in sequence along the contour 1, and connecting the point $Q_{n,i+k+1}$ to a point $Q_{n,i+k+2}$ in sequence along the contour 2; and the $K_b$ mode includes: connecting the point $Q_{n,i+k}$ to the point $Q_{n,i+k+1}$ in sequence along the contour 2, and connecting the point $P_{n,i+1}$ to a point $P_{n,i+2}$ in sequence along the contour 1;

during the using a $L_a$ mode or a $L_b$ mode to generate another continuous printing path from the L-lines:

the $L_a$ mode includes: connecting the point $P_{n+1,i+1}$ to the point $P_{n+1,i+l+1}$ in sequence along the contour 1, and connecting the point $Q_{n+1,i+k+1}$ to a point $Q_{n+1,i+k+2}$ in sequence along the contour 2; and the $L_b$ mode includes: connecting the point $Q_{n+1,i+k}$ to the point $Q_{n+1,i+k+1}$ in sequence along the contour 2, and connecting the point $P_{n+1,i+l+1}$ to a point $P_{n+1,i+l+2}$ in sequence along the contour 1.

In a periodic arrangement of the $K_a$ mode, the $K_b$ mode, the $L_a$ mode and the $L_b$ mode, alternating of the contour 1 and the contour 2 is allowed, to increase strength of structure.

In an embodiment, the generating differentiated textures through a combination the K-lines and the L-lines includes: selecting an activation order of the $K_a$ mode or the $K_b$ mode and an activation order of the $L_a$ mode or the $L_b$ mode to control a texture morphology on surfaces of the model; for the performing offset adjustment (e.g., adjustment of the preset offset and the second offset), spatial curve parameter adjustment (e.g., adjustment of parameters of the spatial curves $f_i$ and the spatial curves $g_i$) and mode activation sequence adjustment and the generating differentiated surface textures, the differentiated surface textures include fish-scale patterns, woven patterns, and rhombic grids, and textures of an inner side surface and an outer side surface are differentially/differentiatedly controllable.

In an embodiment, the parametric control and outputting includes dynamically adjusting the values of k and l based on mechanical simulation results, and the value of k and the value of l are as follows: in a high-stress area, k=l=1, forming a dense connection; in a low-stress area, $k \geq 3$ or $l \geq 3$, forming a sparse hollow structure.

In an embodiment, textures of an inner side surface and an outer side surface are differentially controllable specifically includes: periodically switching the activation order of the $K_a$ mode or the $K_b$ mode and the activation order of the $L_a$ mode or the $L_b$ mode to generate alternating textures; and using different spatial curves for an inner contour and an outer contour respectively, outputting geometric-codes (G-codes) containing the continuous printing paths, and verifying/checking topological continuity.

In an embodiment, in the method for generating 3D printing composite hollow structure based on the alternating connections of the spatial curves, an object with the 3D printing composite hollow structure is further printed (e.g. by a 3D printer or a 3D printing robot) based on the 3D printing path codes.

In a second aspect, a computer device is further provided according to another embodiment of the disclosure, including at least one processor, and a memory communicatively connected to (or in communication with) the at least one processor. The memory is stored with instructions executable by the at least one processor; and the instructions, when being executed by the at least one processor, cause the at least one processor to execute/implement the method for generating the 3D printing composite hollow structure based on alternating connections of spatial curves according to any one of the above-mentioned embodiments.

In a third aspect, a computer-readable storage medium is further provided according to still another embodiment of the disclosure, the computer-readable storage medium is stored with computer instructions, and the computer instructions is configured/used for enabling a computer to execute/implement the method for generating the 3D printing composite hollow structure based on alternating connections of spatial curves according to any one of the above-mentioned embodiments.

Compared with the related art, the method for generating the 3D printing composite hollow structure based on alternating connections of spatial curves provided by the disclosure, can achieve significant improvements in aspects of aesthetic design, mechanical performance, manufacturing efficiency, and multi-material compatibility through the spatial curve mapping and K-L alternating connection algorithms driven by parameterization, and may have advantageous effects as follows.

1. It has an aesthetic design flexibility and a texture programmability, and it can directly control a micro-texture morphology through parameterized texture regulation/adjustment, and it supports generating complex patterns such as the fish-scale patterns, the woven patterns, fractal grids, etc., and the inner contour and the outer contour can be independently controlled. Gradient effects, alternating effects or complement effects of the textures can be realized by dynamic mode switching and combining, as well as the periodical activation sequence.

2. It can achieve optimization of mechanical performance and improvement of topological adaptability, by improving a shear resistance and an impact resistance and using the helical crossover network formed by alternating connections of the K-lines and the L-lines, stress can be dispersed by a topological interlocking effect. Moreover, it can generate continuous printing paths, through path jointing strategies of the $K_a/K_b$ mode (i.e., the $K_a$ mode or the $K_b$ mode) and the $L_a/L_b$ mode (i.e., the $L_a$ mode or the $L_b$ mode), it can ensure that all connection lines are connected head-to-tail to generate a single continuous path, so as to reduce non-productive motions and save printing time. It can adaptively adjust a hollowing rate based on distribution of the stress, thereby can save materials in a non-load-bearing area; and meanwhile it can avoid waste of the materials caused by printing failures through a topological continuity check/verification. It also supports integrally formed complex geometric structures such as multi-holes structures, overhanging structures, and structures with embedded channel, and thus there is no need of post-assembling or a support structure.

3. By separately/independently controlling the spatial curves of the inner contour and the outer contour, different materials can be specified for the contour 1 and the contour 2 respectively (e.g., rigid polylactic acid (PLA) for the contour 1 and flexible thermoplastic polyurethane (TPU) for the contour 2), so as to realize a rigid-flexible composite structure. By controlling distribution of the materials through gradient parameters, a high degree-of-freedom and highly reliable solution can be provided for 3D printing of a complex functional structure.

These aspects or other aspects of the disclosure will be more concise and understandable in the description of the following embodiments. It should be understood that the above general description and the detailed description in the following context are merely exemplary and explanatory, and do not limit the disclosure.

BRIEF DESCRIPTION OF DRAWINGS

In order to more clearly describe specific embodiments of the disclosure or technical solutions in the related art, a brief introduction to attached drawings used in the description of the specific embodiments or the related art will be given below. The attached drawings are used to provide further understanding of the disclosure and form a part of the specification. The attached drawings and the specific embodiments of the disclosure are used together to explain the disclosure and do not constitute limitations on the disclosure.

DETAILED DESCRIPTION OF EMBODIMENTS

In order to make purposes, technical solutions and advantages of embodiments of the disclosure clearer, the disclosure will be further detailed described in combination with the attached drawings and embodiments of the disclosure. It should be understood that the specific embodiments described here are only for explaining the disclosure and are not intended to limit the disclosure.

In some of the processes described in the specification and the claims of the disclosure, as well as in the attached drawings mentioned above, multiple operations appear in a specific order are composed. However, it should be clearly understood that these operations may not be executed or may not be executed in parallel in the order they appear in the disclosure. Serial numbers of operations such as 101, 102, etc. are only used to distinguish between different operations, and the serial numbers itself does not represent any execution order. In addition, these processes can include more or fewer operations, and these operations can be executed sequentially or in parallel. It should be noted that the descriptions of "first", "second", etc. in the disclosure are used to distinguish different messages, devices, modules, etc., and do not represent the order or limit that "first" and "second" are different types.

Below, the technical solutions in the exemplary embodiments of the disclosure will be clearly and completely described in conjunction with the attached drawings. Apparently, the described exemplary embodiments are only a part of the embodiments of the disclosure, not all of them. Based on the embodiments of the disclosure, all other embodiments obtained by those skilled in the art without creative labor are within the scope of protection of the disclosure.

To solve problems in methods for generating three-dimensional (3D) printing hollow structures in the related art, such as monotonous textures, undifferentiated interior and exterior designs, and poor path continuities, the disclosure provides a method for generating a 3D printing composite hollow structure based on alternating connections of spatial curves, by controlling a topological connection relationship between an inner contour and an outer contour through mathematical parameterization, thereby achieving programmable design for textures and mechanical performance optimization.

The following is a detailed description of technical solutions of the disclosure.

Figure 1:
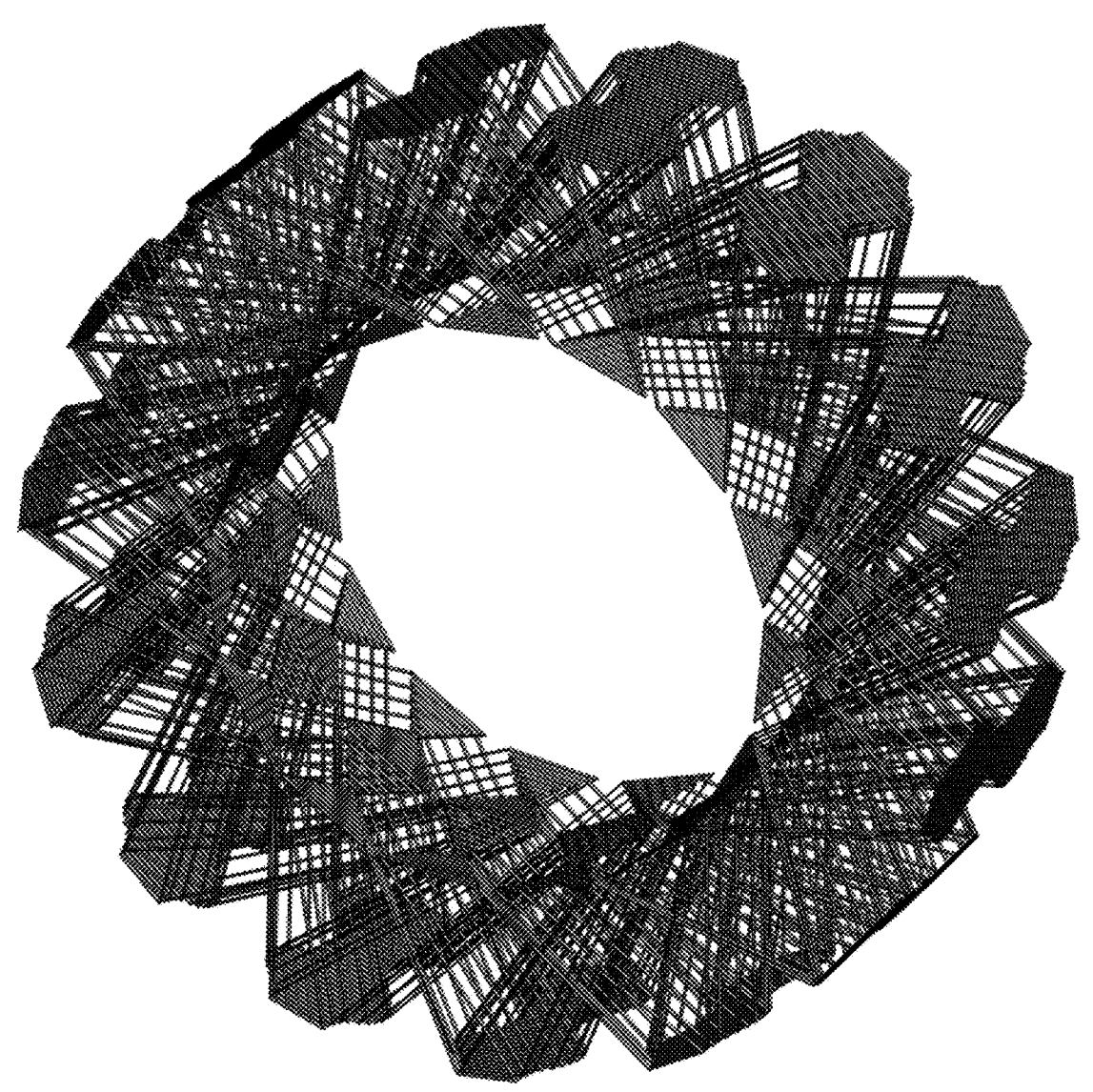
FIG. 1 illustrates a schematic perspective structural view of an annular structure with a texture A printed by a method for generating a 3D printing composite hollow structure based on alternating connections of spatial curves according to an embodiment of the disclosure.
Figure 2:
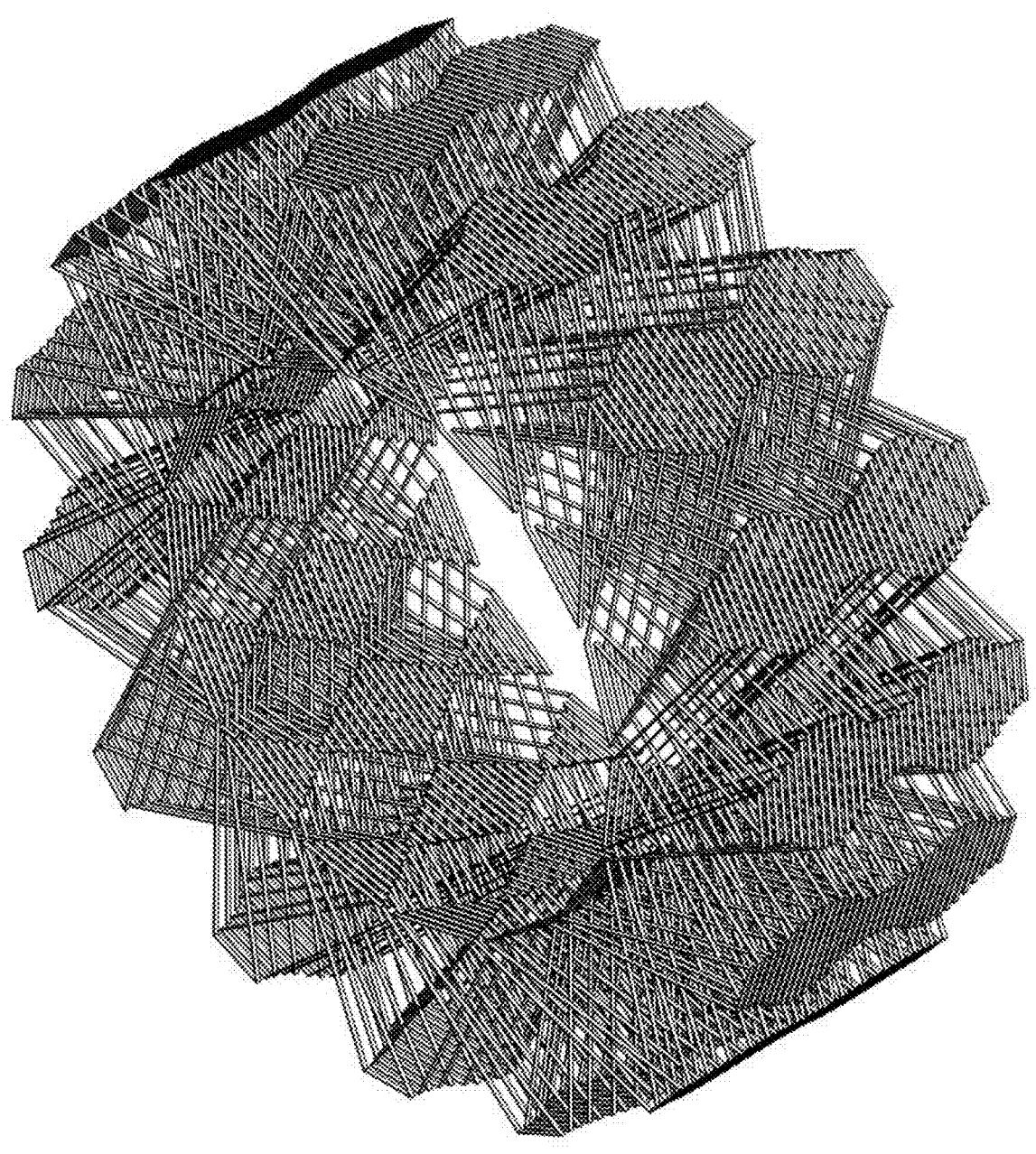
FIG. 2 illustrates a schematic perspective structural view observed from a side of the annular structure with the texture A printed by the method for generating the 3D printing composite hollow structure based on alternating connections of spatial curves according to the embodiment of the disclosure.
Figure 3:
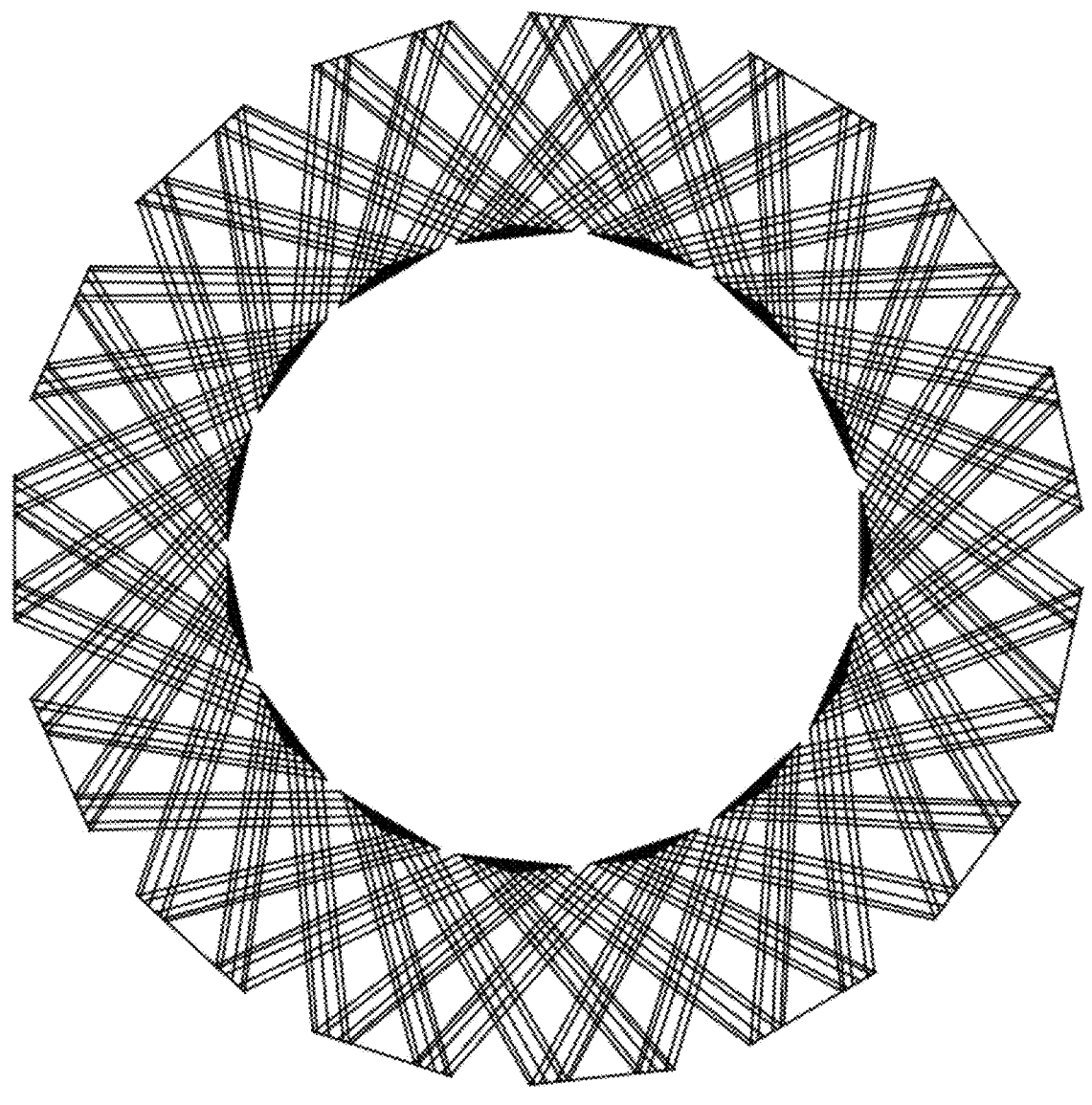
FIG. 3 illustrates a front view of the annular structure with the texture A printed by the method for generating the 3D printing composite hollow structure based on alternating connections of spatial curves according to the embodiment of the disclosure.
Figure 4:
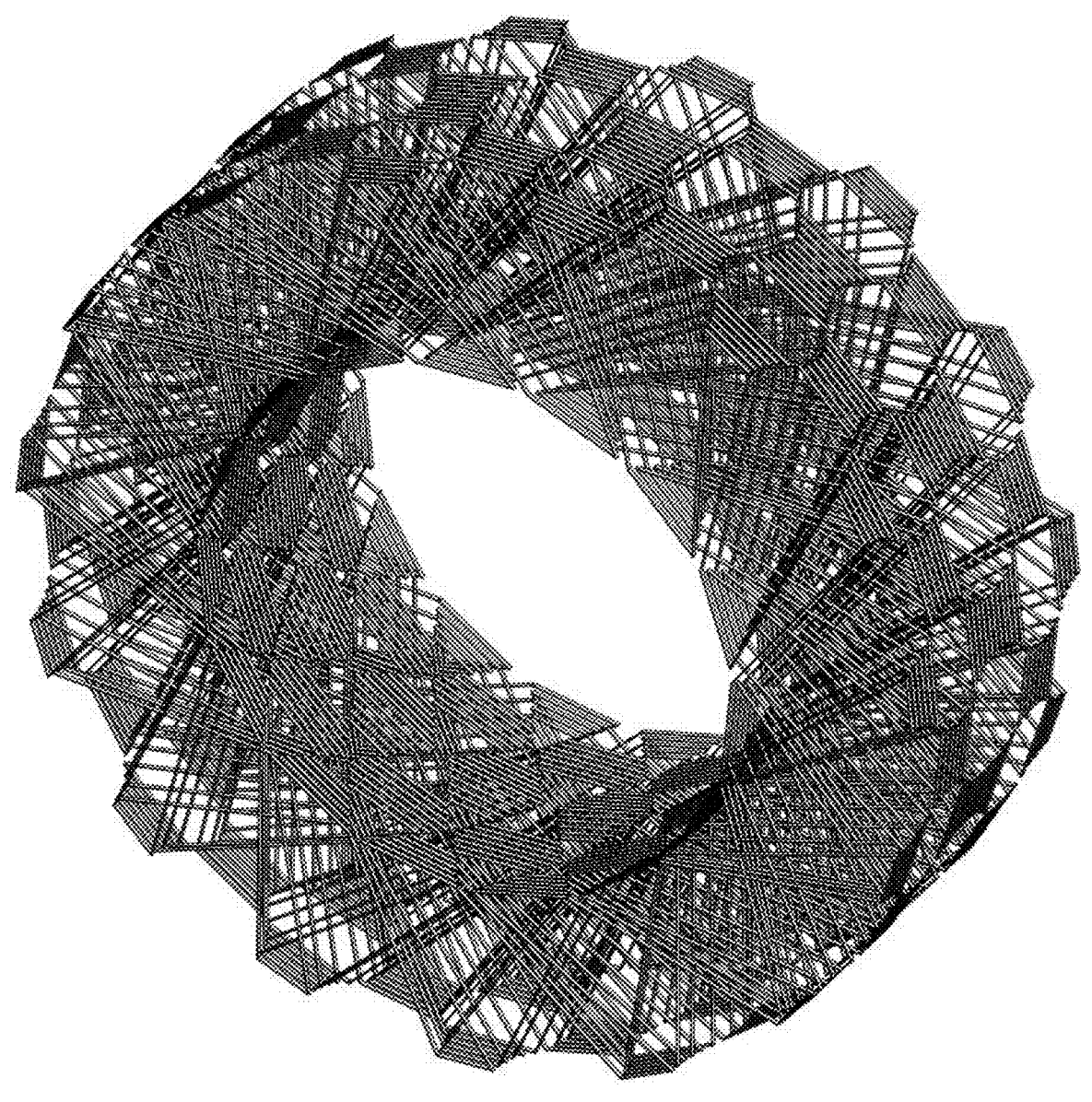
FIG. 4 illustrates a schematic perspective structural view of an annular structure with a texture B printed by a method for generating a 3D printing composite hollow structure based on alternating connections of spatial curves according to another embodiment of the disclosure.
Figure 5:
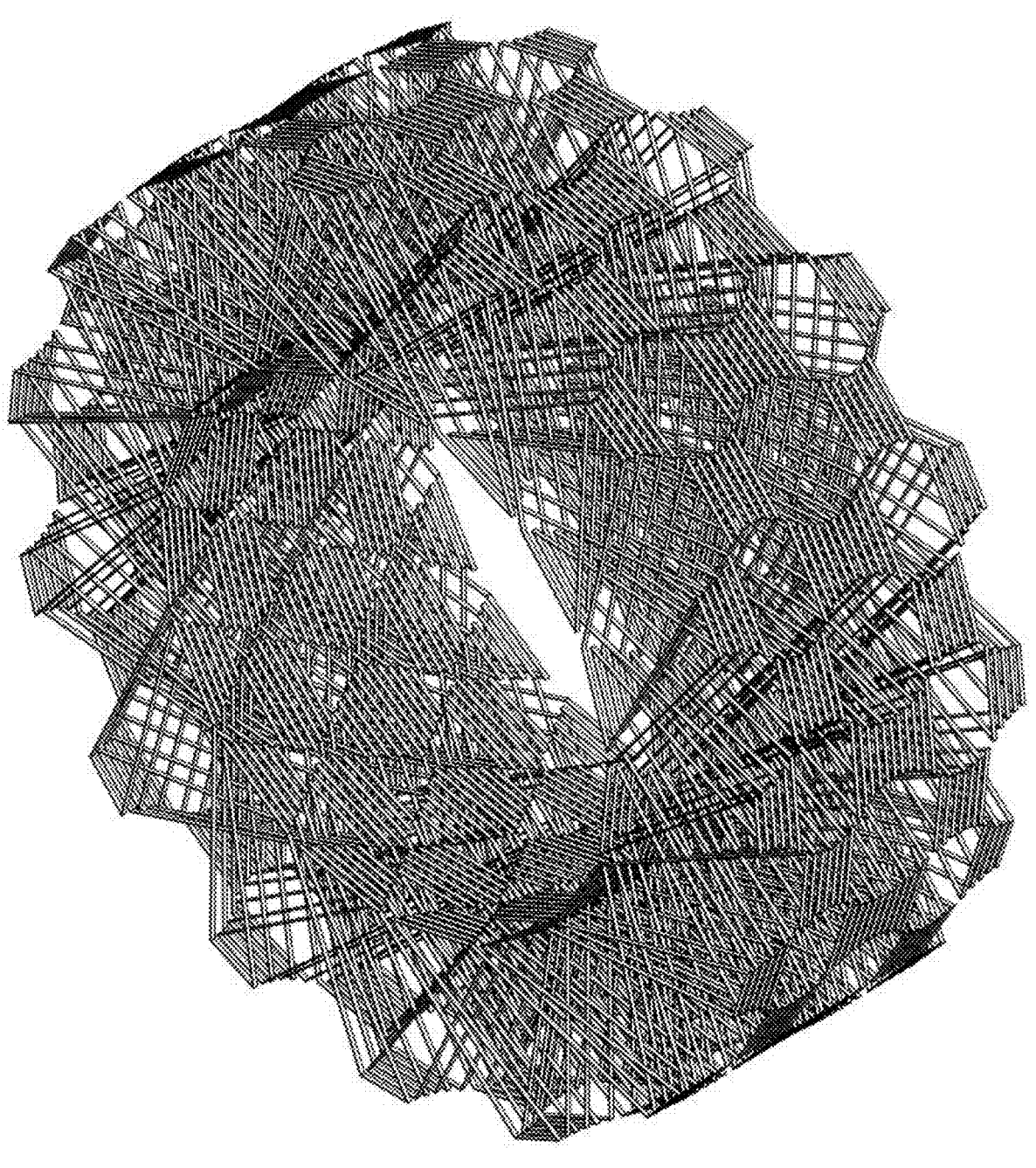
FIG. 5 illustrates a schematic perspective structural view observed from a side of the annular structure with the texture B printed by the method for generating the 3D printing composite hollow structure based on alternating connections of spatial curves according to the another embodiment of the disclosure.
Figure 6:
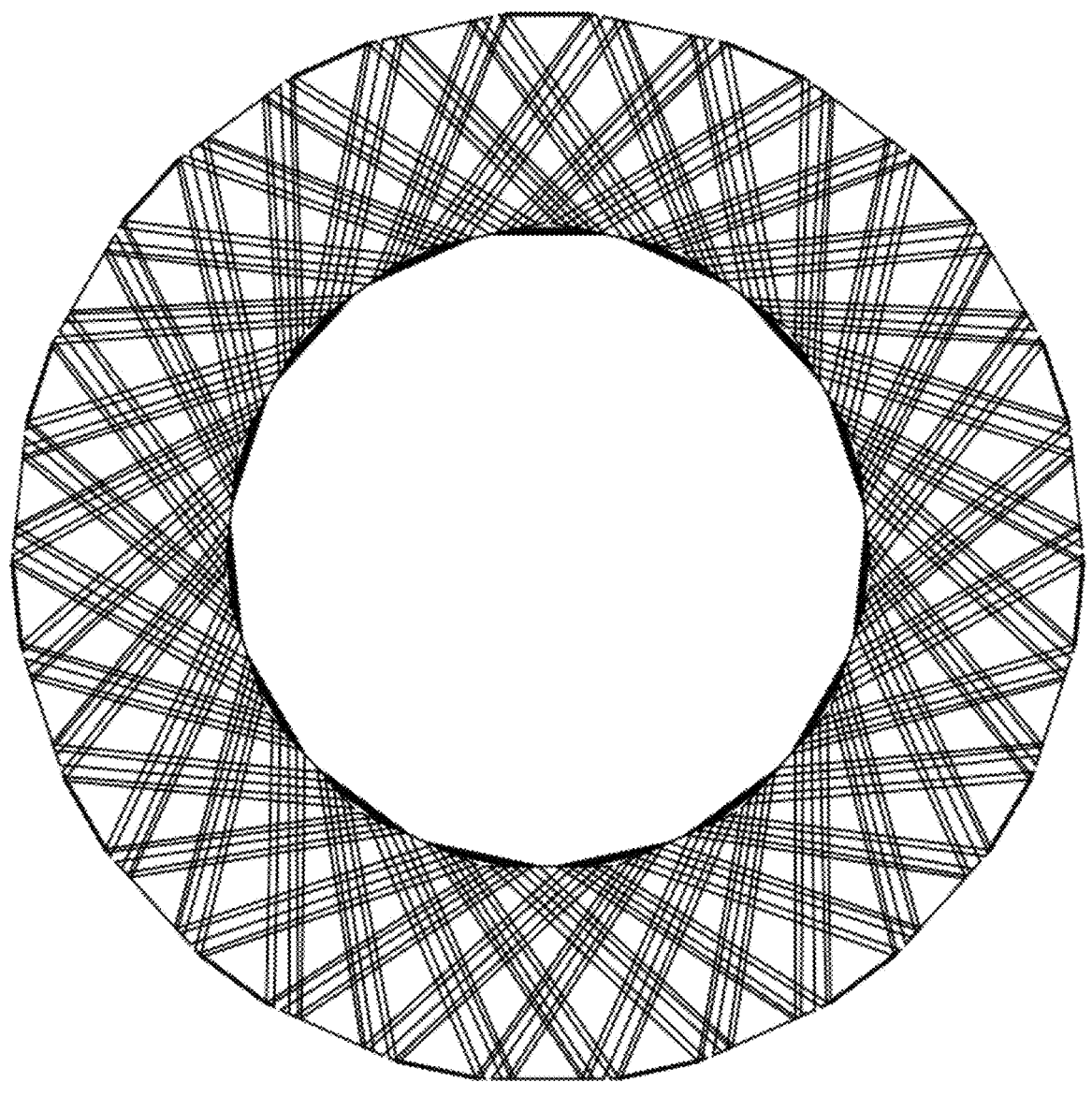
FIG. 6 illustrates a front view of the annular structure with the texture B printed by the method for generating the 3D printing composite hollow structure based on alternating connections of spatial curves according to the another embodiment of the disclosure.
Figure 7:
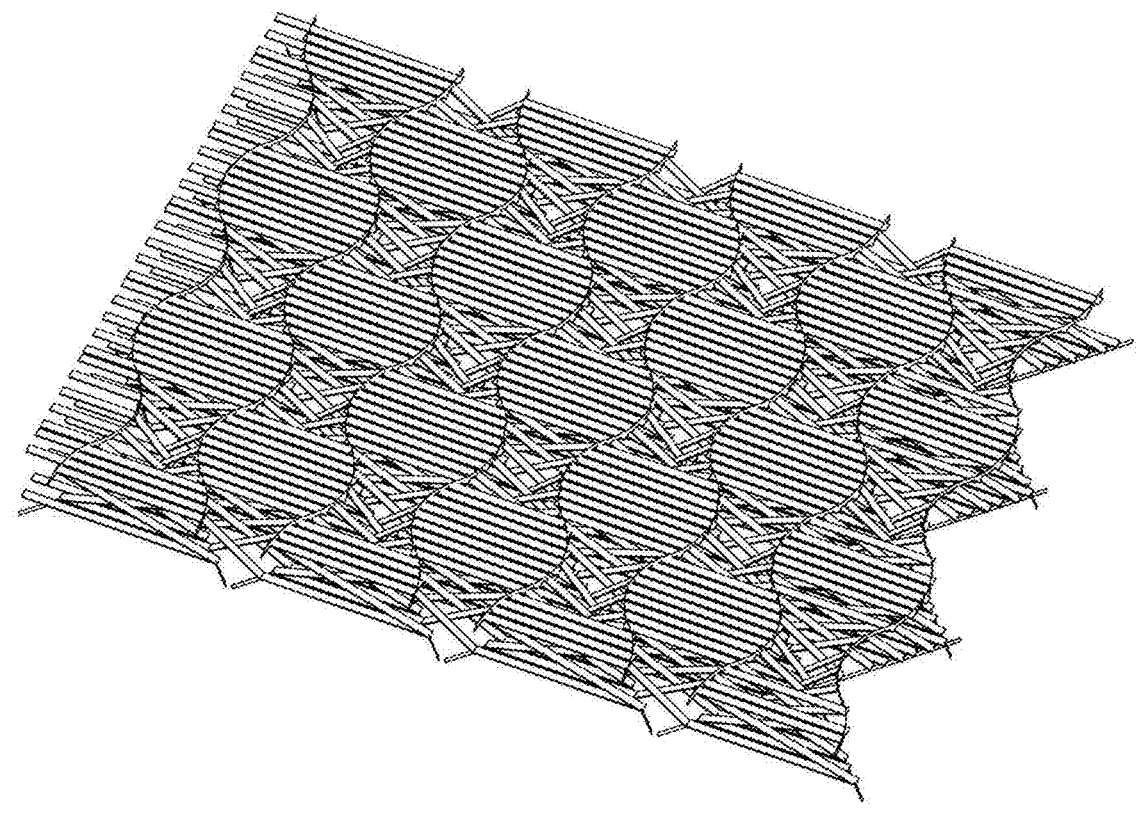
FIG. 7 illustrates a front structural view of a non-holed structure with curves printed by a method for generating a 3D printing composite hollow structure based on alternating connections of spatial curves according to still another embodiment of the disclosure.
Figure 8:
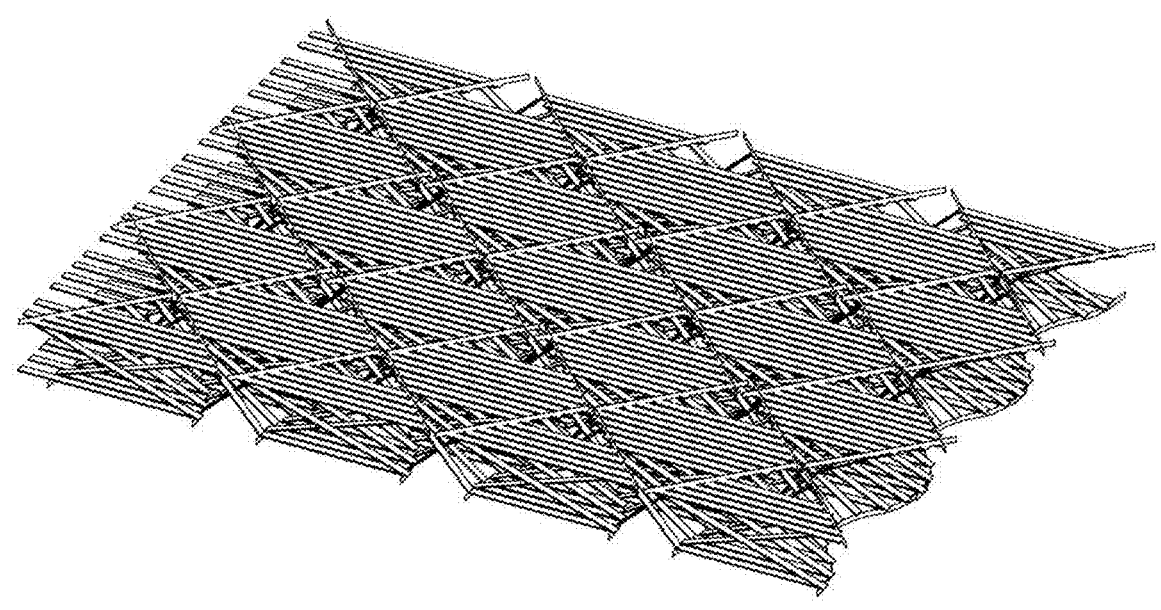
FIG. 8 illustrates a rear structural view of the non-holed structure with curves printed by the method for generating the 3D printing composite hollow structure based on alternating connections of spatial curves according to the still another embodiment of the disclosure.
Figure 9:
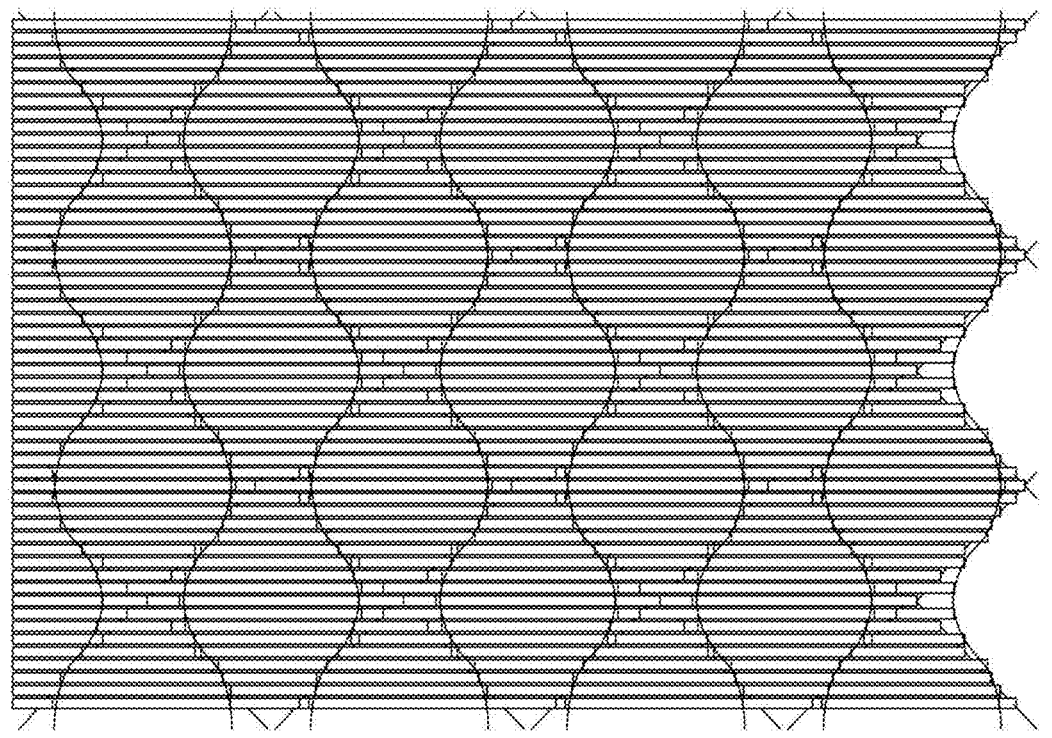
FIG. 9 illustrates a top view of the non-holed structure with curves printed by the method for generating the 3D printing composite hollow structure based on alternating connections of spatial curves according to the still another embodiment of the disclosure.
Figure 10:
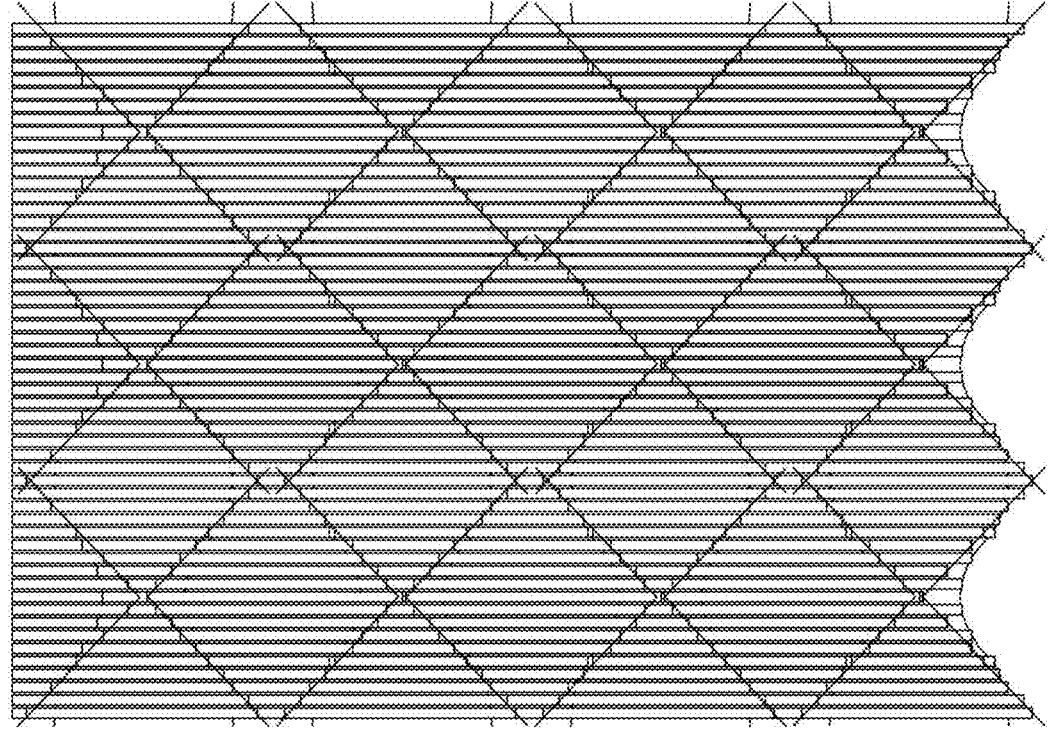
FIG. 10 illustrates a bottom view of the non-holed structure with curves printed by the method for generating the 3D printing composite hollow structure based on alternating connections of spatial curves according to the still another embodiment of the disclosure.
Figure 11:
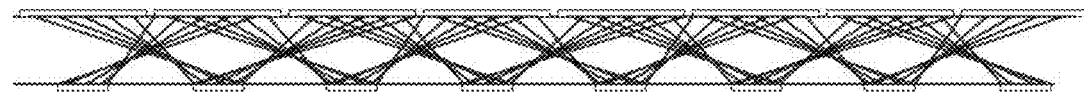
FIG. 11 illustrates a side view of the non-holed structure with curves printed by the method for generating the 3D printing composite hollow structure based on alternating connections of spatial curves according to the still another embodiment of the disclosure.
Figure 12:
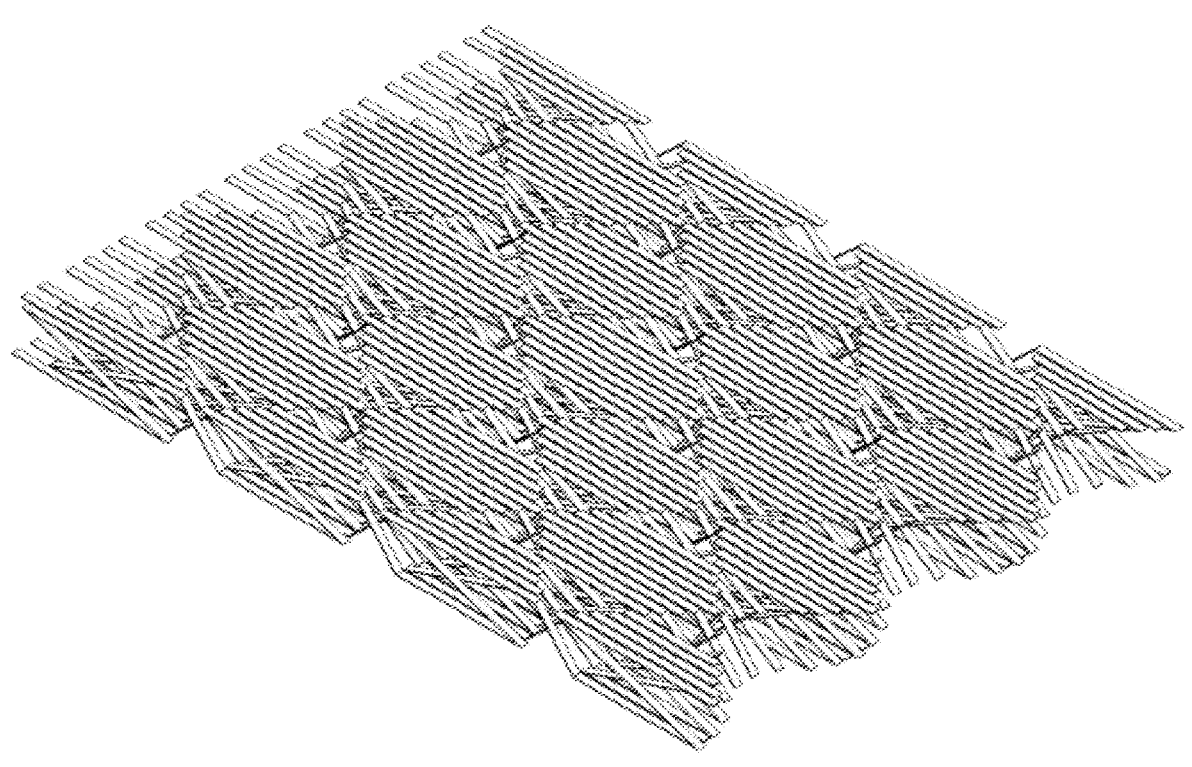
FIG. 12 illustrates a schematic structural view of a non-holed structure without curve printed by the method for generating the 3D printing composite hollow structure based on alternating connections of spatial curves according to even still another embodiment of the disclosure.
Figure 13:
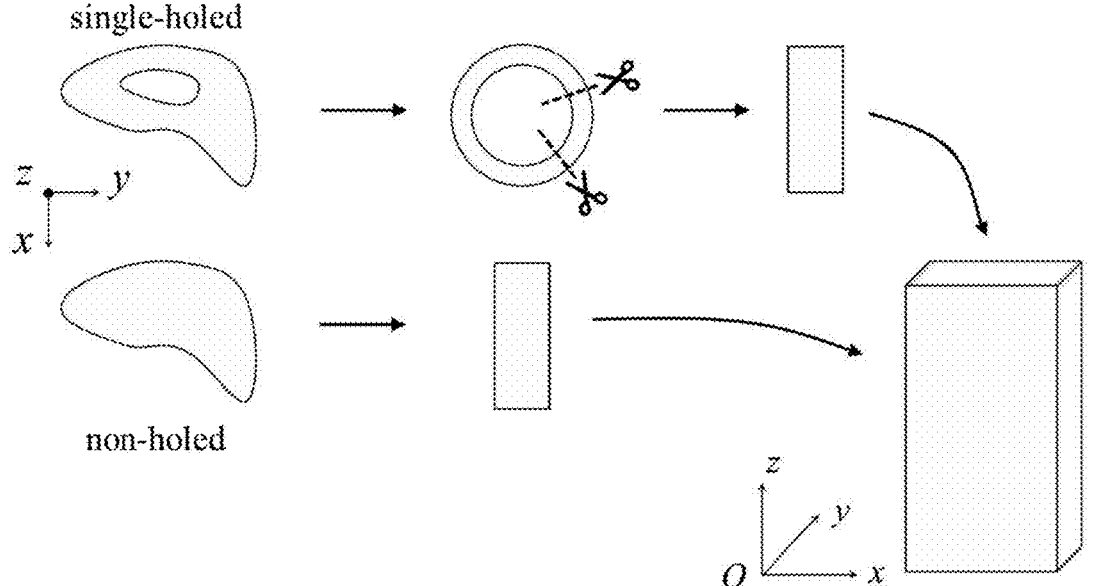
FIG. 13 illustrates a schematic principle view of a path of using a 3D model to directly generate a 3D printing hollow structure in a method for generating a 3D printing composite hollow structure based on alternating connections of spatial curves according to an embodiment of the disclosure.
Figure 14:
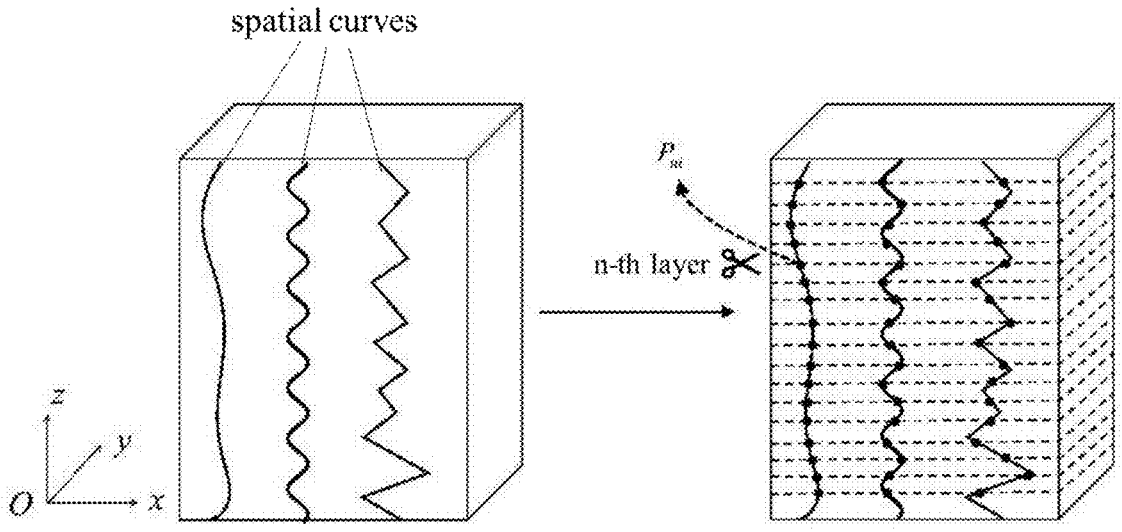
FIG. 14 illustrates a schematic view of connecting intersection points $P_{n,i}$ in a method for generating a 3D printing composite hollow structure based on alternating connections of spatial curves according to an embodiment of the disclosure.
Figure 15:
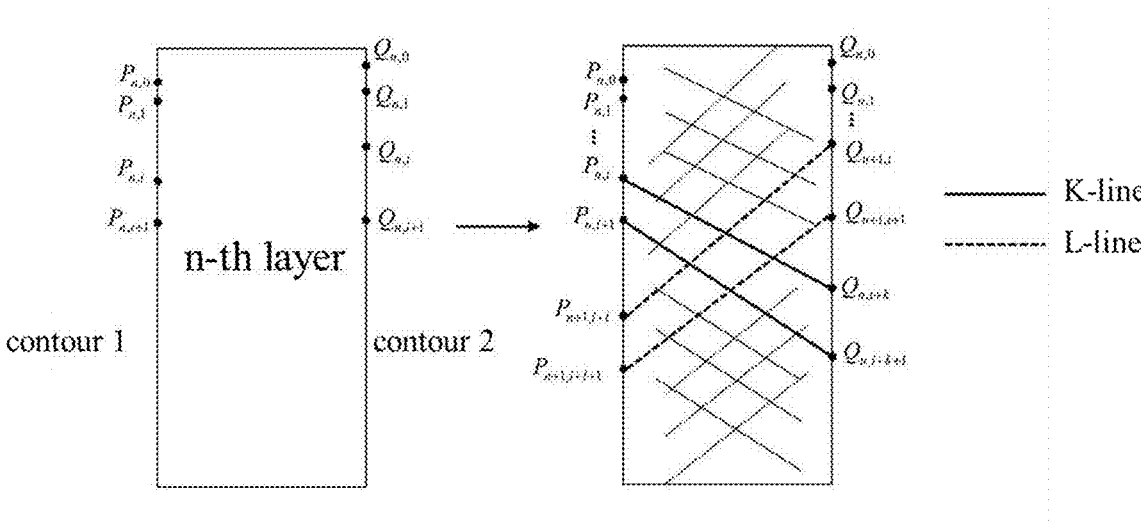
FIG. 15 illustrates a schematic view of K-lines and L-lines alternately interweave to form a hollow structure in a method for generating a 3D printing composite hollow structure based on alternating connections of spatial curves according to an embodiment of the disclosure.
Figure 16:
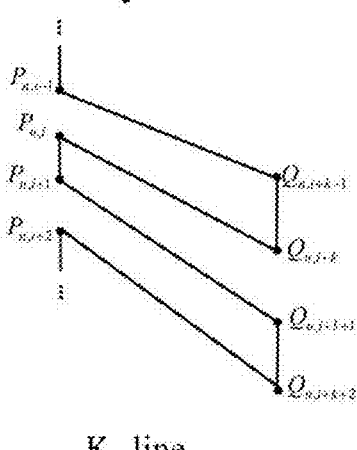
FIG. 16 illustrates a schematic view of in a method for generating a 3D printing composite hollow structure based on alternating connections of spatial curves according to an embodiment of the disclosure.
Figure 17:
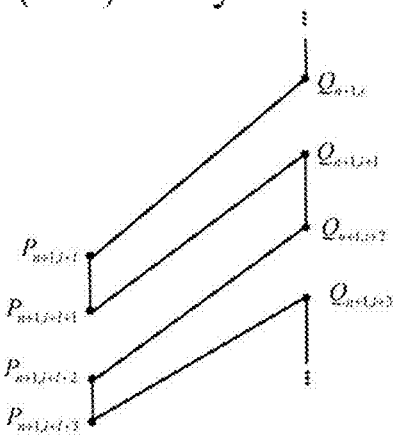
FIG. 17 illustrates a schematic view of L-lines connected in a $L_a$ mode or a $L_b$ mode for forming a hollow structure in a method for generating a 3D printing composite hollow structure based on alternating connections of spatial curves according to an embodiment of the disclosure.
Figure 17:
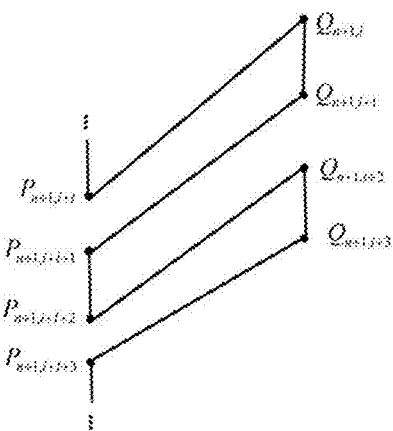
Figure 18:
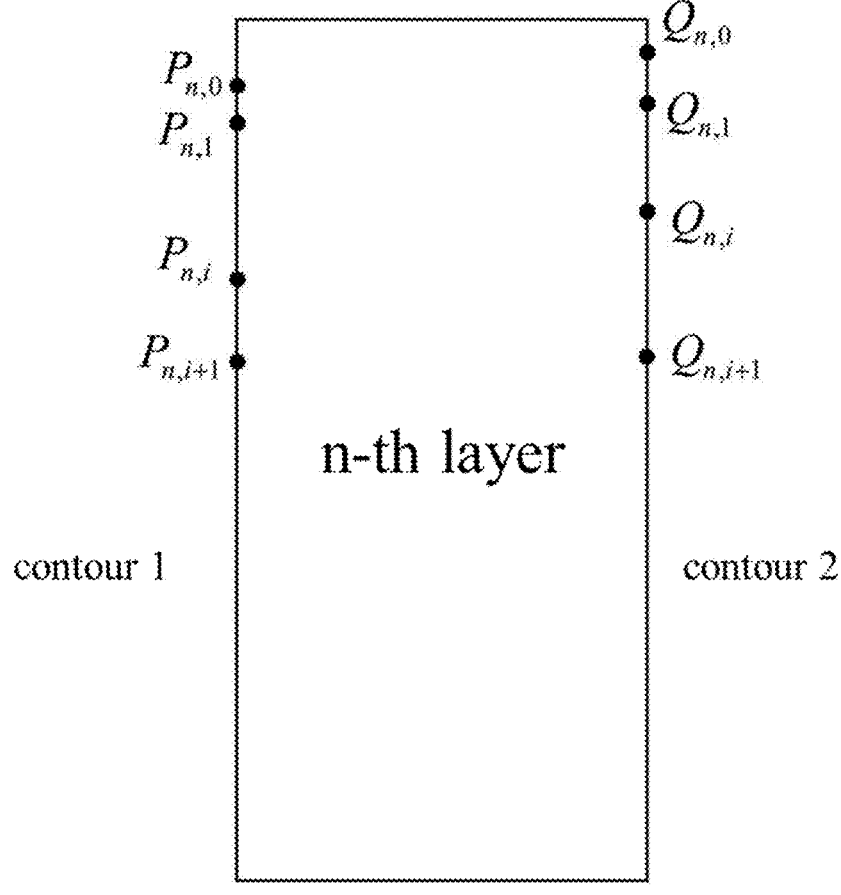
FIG. 18 illustrates a schematic view of $P_{n,i}$ and $Q_{n,j}$ of contour 1 and contour 2 intersecting with spatial curves in a method for generating a 3D printing composite hollow structure based on alternating connections of spatial curves according to an embodiment of the disclosure

As FIG. 1 through FIG. 18 illustrated, in an embodiment of the disclosure, the method for generating the 3D printing composite hollow structure based on alternating connections of spatial curves is provided, including following steps (1) through (5).

(1) Model discretizing and section contour parsing, including: a target 3D model is discretized into layers along a printing direction and sections are extracted layer-by-layer. Each of topological states of the sections of the respective layers is assumed to be a non-holed state or a single-holed state, and the sections of the layers are processed by classification based on each of the topological states of the sections of the respective layers being the non-holed state or the single-holed state as follows:

For the section of the layer being a non-holed section, two points on the section of each layer are selected, a single contour is divided into two parts as a contour 1 and a contour 2 by the two points.

For the section of the layer being a single-holed section, an external boundary is extracted as the contour 2 and an internal hole boundary is extracted as the contour 1 to thereby form a nested structure.

(2) Spatial curve mapping, including: in a 3D space, a surface 1 constituted by F number of parameterized spatial curves $f_i$ for the contours 1 of all the layers is generated, and a surface 2 constituted by G number of parameterized spatial curves $g_i$ for the contours 2 of all the layers is generated; each of the spatial curves $f_i$ intersects the contour 1 of a n-th layer of the layers at a point $P_{n,i}$, and each of the spatial curves $g_i$ intersects the contour 2 of a n-th layer of the layers at a point $Q_{n,i}$.

(3) K-L alternating connection path generation, including: K-lines are generated in the n-th layer to connect intersection points on the contour 1 with intersection points on the contour 2 as per a preset offset, and L-lines are generated in a (n+1)-th layer to connect intersection points on the contour 2 with the intersection points of the contour 1 as per a second offset.

(4) Path optimizing and jointing, including: using a $K_a$ mode or a $K_b$ mode to generate a continuous printing path from the K-lines; and using a $L_a$ mode or a $L_b$ mode to generate the another continuous printing path from the L-lines, thereby generating differentiated surface textures through a combination the K-lines and the L-lines.

(5) Parametric control and outputting, including: offset performing adjustment, spatial curve parameter adjustment and mode activation sequence adjustment are performed, differentiated surface textures are generated, and 3D printing path codes are output.

In an embodiment, a geometric correspondence between the contour 1 and the contour 2 is determined by a contour division method and a point sampling method. The spatial curves $f_i$ and $g_i$ are continuous curves generated by parameterized functions, and the continuous curves include at least one kind of the following: B-spline curves, trigonometric function curves, Bezier curves, conic sections, and polylines.

In an embodiment, intersection points of the spatial curves with the contour 1 and the contour 2 of each of the layers are calculated and include the intersection points on the contour 1 of the n-th layer being $\{P_{n,i}\}$, and the intersection points on the contour 2 of the n-th layer being $\{Q_{n,i}\}$. The generating K-lines in the n-th layer includes connecting the point $P_{n,i}$ with a point $Q_{n,i}+k$, where k is the preset offset. The generating L-lines in the (n+1)-th layer includes connecting a point $Q_{n+1,i+k}$ to a point $P_{n+1,i+1}$, where l is the second offset.

In an embodiment, a value of k satisfies a range of $1 \le k \le 10$, and a value of l satisfies a range of $1 \le l \le 10$, and the K-lines and the L-lines together form a cross-layer helical crossover network. The K-L alternating connection path generation includes:

Generating the K-lines, including: in the n-th layer, the point $P_{n,i}$ is connected with the point $Q_{n,i+k}$, and a point $P_{n,i+1}$ is connected with a point $Q_{n,i+k+1}$, and so on, to thereby generate the K-lines, where k is the preset offset ($1 \le k \le 10$).

Generating the L-lines, including: in the (n+1)-th layer, the point $Q_{n+1,i+k}$ is connected with the point $P_{n+1,i+1}$, and a point $Q_{n+1,i+k+1}$ is connected with a point $P_{n+1,i+l+1}$, and so on, to thereby generate the L-lines, where l is the preset second offset ($1 \le l \le 10$).

In an embodiment, a mode activation sequence for the K-lines and the L-lines are cyclically switched as per a preset rule. During the using a $K_a$ mode or a $K_b$ mode to generate a continuous printing path from the K-lines:

The $K_a$ mode includes: the point $P_{n,i}$ is connected to the point $P_{n,i+1}$ in sequence along the contour 1, and the point $Q_{n,i+k+1}$ is connected to a point $Q_{n,i+k+2}$ in sequence along the contour 2.

The $K_b$ mode includes: the point $Q_{n+1,i+k}$ is connected to the point $Q_{n,i+k+1}$ in sequence along the contour 2, and the point $P_{n,i+1}$ is connected to a point $P_{n,i+2}$ in sequence along the contour 1.

During the using a $L_a$ mode or a $L_b$ mode to generate another continuous printing path from the L-lines:

The $L_a$ mode includes: the point $P_{n+1,i+1}$ is connected to the point $P_{n+1,i+l+1}$ in sequence along the contour 1, and the point $Q_{n+1,i+k+1}$ is connected to a point $Q_{n+1,i+k+2}$ in sequence along the contour 2.

The $L_b$ mode includes: the point $Q_{n+1,i+k}$ is connected to the point $Q_{n+1,i+k+1}$ in sequence along the contour 2, and the point $P_{n+1,i+l+1}$ is connected to a point $P_{n+1,i+l+2}$ in sequence along the contour 1.

In an embodiment, the generating differentiated textures through a combination the K-lines and the L-lines includes: an activation order of the $K_a$ mode or the $K_b$ mode and an activation order of the $L_a$ mode or the $L_b$ mode is selected to control a texture morphology on surfaces of the model. For the performing offset adjustment, spatial curve parameter adjustment and mode activation sequence and the generating differentiated surface textures, the differentiated surface textures include fish-scale patterns, woven patterns, and rhombic grids. Textures of an inner side surface and an outer side surface are differentially controllable.

In an embodiment, during the parametric control and outputting, the values of k and l based on mechanical simulation results can be dynamically adjusted, and the value k and the value of l are as follows:

In a high-stress area, k=l=1, thereby a dense connection can be formed.

In a low-stress area, k≥3 or l≥3, thereby a sparse hollow structure can be formed.

In an alternative embodiment of the disclosure, textures of an inner side surface and an outer side surface are differentially controllable specifically includes:

Periodically switching the activating order of the $K_a$ mode or the $K_b$ mode and the activating order of the $L_a$ mode or the $L_b$ mode to generate alternating textures. The $K_a$ mode or the $K_b$ mode, and the $L_a$ mode or the $L_b$ mode can be periodically switched on the inner side and the outer side; and paths of the contour 1 and the contour 2 themselves can be periodically embedded to enhance strength of the hollow structure.

Different spatial curves can be used for an inner contour and an outer contour. Geometric-codes (G-codes) containing the continuous printing paths can be output, and topological continuity can be verified.

When generating paths to 3D-print a hollow structure, a plane is used to cut the hollow structure and a section of the hollow structure is extracted to obtain a two-dimensional (2D) area. For the 2D area, it can be divided into two types: a 2D area with holes and a 2D area without holes. In an embodiment, a non-holed state and a single-holed state of the 2D area are merely considered. For the area without holes, it can be equivalent to a strip-shaped area, composed of a contour 1 and a contour 2. For the region with one hole, it is considered to be composed of an internal contour 1 and an external contour 2. All the contours 1 define the surface 1 in the 3D space, and all the contours 2 define the surface 2 in the 3D space. The surface 1 and the surface 2 respectively contain the F number of spatial curves f and the G number of spatial curves g, the i-th spatial curve $f_i$ and the i-th spatial curve $g_i$ intersect with the contour 1 and the contour 2 of the n-th layer at the point $P_{n,i}$ and the point $Q_{n,i}$ respectively.

In an embodiment, lines are connected between a point P and a point Q. In the n-th layer, the point $P_{n,i}$ is connected to the point $Q_{n,i+k}$, the point $P_{n,i+1}$ is connected to the point $Q_{n,i+k+1}$, and so on, thereby to generate the K-lines, k represents difference between serial numbers of the point P and the point Q, and k is a variable parameter. In the (n+1)-th layer, the point $Q_{n+1,i+k}$ is connected to the point $P_{n+1,i+1}$, the point $Q_{n+1,i+k+1}$ is connected to the point $P_{n+1,i+l+1}$, and so on, thereby to generate the L-lines. The K-lines and the L-lines alternate in sequence to form the hollow structure. The K-lines can be connected end-to-end to form a single line; and the L-lines can be connected end to end to form a single line. For the K-lines, a first way to form the single line is the $K_a$ mode, the $K_a$ mode includes: connecting the point $P_{n,i}$ to the point $P_{n,i+1}$ and connecting the point $Q_{n,i+k+1}$ to the point $Q_{n,i+k+2}$, and so on, thereby to generate a $K_a$ line; a second way to form the single line is the $K_b$ mode, the $K_b$ mode includes: connecting the point $Q_{n,i+k}$ to the point $Q_{n,i+k+1}$ and connecting the point $P_{n,i+1}$ to the point $P_{n,i+2}$, and so on, thereby to generate a Ky line. For the L-lines, the first way to form the single line is the $L_a$ mode, the $L_a$ mode includes: connecting the point $P_{n+1,i+1}$ to the point $P_{n+1,i+l+1}$ and connecting the point $Q_{n+1,i+k+1}$ to the point $Q_{n+1,i+k+2}$, and so on, thereby to generate a $L_a$ line.

In an embodiment, the second way to form the single line is the $L_b$ mode, the $L_b$ mode includes: connecting the point $P_{n+1,i+l+1}$ to the point $P_{n+1,i+l+2}$ and connecting the point $Q_{n+1,i+k}$ to the point $Q_{n+1,i+k+1}$, and so on, thereby to generate a $L_b$ line.

By controlling shapes of the spatial curves, arrangements of the $L_a$ mode and the $L_b$ mode, and arrangements of the $K_a$ mode and the $K_b$ mode, the textures on the surface of the model of the hollow structure can be varied. The different spatial curves between the inner side and the outer side also enable the textures between the inner side and the outer side to be differentiated.

In an embodiment, an object with the 3D printing composite hollow structure can be printed based on the 3D printing path codes outputted in the method for generating the 3D printing composite hollow structure based on alternating connections of spatial curves. The object is, for example, a 3D-printed shoe, an insole, a pillow, a glove cushioning layer, a helmet cushioning layer, a bowl holder, a keyboard holder, etc.

To sum up, the method for generating the 3D printing composite hollow structure based on alternating connections of spatial curves provided by the disclosure, can achieve significant improvements in aspects of aesthetic design, mechanical performance, manufacturing efficiency, and multi-material compatibility through the spatial curve mapping driven by a parameterization and K-L alternating connection algorithms. It has an aesthetic design flexibility and a texture programmability, and it can directly control a micro-texture morphology through parameterized texture regulation/adjustment, and it supports generating complex patterns such as the fish-scale patterns, the woven patterns, fractal grids, etc., and the inner contour and the outer contour can be independently controlled. Gradient effects, alternating effects or complement effects of the textures can be realized by dynamic mode switching and combining, as well as the periodical activation sequence. It can achieve optimization of mechanical performance and improvement of topological adaptability, by improving a shear resistance and an impact resistance and using the helical crossover network formed by alternating connections of the K-lines and the L-lines, stress can be dispersed by a topological interlocking effect. Moreover, it can generate continuous printing paths, through path jointing strategies of the $K_a/K_b$ mode (i.e., the $K_a$ mode or the $K_b$ mode) and the $L_a/L_b$ mode (i.e., the $L_a$ mode or the $L_b$ mode), it can ensure that all connection lines are connected head-to-tail to generate a single continuous path, so as to reduce non-productive motions and save printing time. It can adaptively adjust a hollowing rate based on distribution of the stress, thereby can save materials in a non-load-bearing area; and meanwhile it can avoid waste of the materials caused by printing failures through a topological continuity check/verification. It also supports integrally formed complex geometric structures such as multi-holes structures, overhanging structures, and structures with embedded channel, and thus there is no need of post-assembling or a support structure.

By separately/independently controlling the spatial curves of the inner contour and the outer contour, different materials can be specified for the contour 1 and the contour 2 respectively (e.g., rigid polylactic acid (PLA) for the contour 1 and flexible thermoplastic polyurethane (TPU) for the contour 2), so as to realize a rigid-flexible composite structure. By controlling distribution of the materials through gradient parameters, a high degree-of-freedom and highly reliable solution can be provided for 3D printing of a complex functional structure.

It should be understood that although the above steps are described in a certain order, they are not necessarily executed in the orders mentioned above. Unless otherwise specified in the disclosure, there is no strict order limit for the execution of these steps, and these steps can be executed in other orders. Moreover, some of the steps in the disclosure may include multiple steps or multiple stages, which are not necessarily completed at the same time, but can be executed at different times. The order of the executions of these steps or stages is not necessarily carried out sequentially, but can be executed alternatively or in rotation with at least a portion of other steps or stages.

In an embodiment, a computer device is provided, including at least one processor and a memory communicatively connected to (also referred to as in communication with) the at least one processor. The memory is stored with instructions; the instructions is executable by the at least one processor. The instructions, when being executed by the at least one processor, cause/enable the at least one processor to execute/implement the steps of the method for generating the 3D printing composite hollow structure based on alternating connections of spatial curves.

In an embodiment, a computer-readable storage medium is further provided. The computer-readable storage medium is stored with computer instructions; the computer instructions are used to enable a computer to execute/implement the steps of the method for generating the 3D printing composite hollow structure based on alternating connections of spatial curves.

Those skilled in the art can understand that all or part of the processes in the above-mentioned embodiments can be accomplished by instructing relevant hardware through computer programs characterized by computer instructions. The computer programs can be stored in a non-volatile computer-readable storage medium, and when the computer programs are executed, the computer programs can include the processes of the embodiments of the above-mentioned methods. Among them, any reference to a memory, a storage, a database or other media used in each embodiment provided in the disclosure may include at least one of the non-volatile memories and a volatile memory.

A non-volatile memory can include a read-only memory, a magnetic tape, a floppy disk, a flash memory or an optical storage, etc. A volatile memory can include a random-access memory or an external cache memory. As an illustration and not a limitation, the random-access memory (RAM) can be various forms, such as a static random-access memory or a dynamic random-access memory.

The above descriptions are only preferred embodiments of the disclosure and are not intended to limit the disclosure. Any modifications, equivalent substitutions, and improvements made within the spirits and principles of the disclosure should be included within the scope of protection of the disclosure.

What is claimed is:

1. A method for generating a three-dimensional (3D) printing composite hollow structure based on alternating connections of spatial curves, comprising following steps of:

model discretizing and sectional contour parsing, comprising: discretizing, by a processor of a computer device, a target 3D model into layers along a printing direction and extracting sections layer-by-layer, assuming each of topological states of the sections of the respective layers is a non-holed state or a single-holed state, and processing by classification, by the processor of the computer device and based on each of the topological states of the sections of the respective layers being the non-holed state or the single-holed state as follows:

for the section of the layer being a non-holed section, selecting, by the processor of the computer device, two points on the section of the layer, and the two points dividing a single contour into two parts as a contour 1 and a contour 2;

for the section of the layer being a single-holed section, extracting, by the processor of the computer device, an external boundary as the contour 2 and an internal hole boundary as the contour 1 to thereby form a nested structure;

spatial curve mapping, comprising: in a 3D space, generating, by the processor of the computer device, a surface 1 constituted by F number of parameterized spatial curves $f_i$ for the contours 1 of all the layers, generating, by the processor of the computer device, a surface 2 constituted by G number of parameterized spatial curves $g_i$ for the contours 2 of all the layers, each of the spatial curves $f_i$ intersecting the contour 1 of a n-th layer of the layers at a point $P_{n,i}$, and each of the spatial curves $g_i$ intersecting the contour 2 of the n-th layer at a point $Q_{n,i}$;

K-L alternating connection path generation, comprising: generating, by the processor of the computer device, K-lines in the n-th layer to connect intersection points on the contour 1 with intersection points on the contour 2 as per a preset offset, and generating, by the processor of the computer device, L-lines in a (n+1)-th layer to connect intersection points on the contour 2 with intersection points on the contour 1 as per a second offset;

path optimizing and jointing, comprising: using, by the processor of the computer device, a $K_a$ mode or a $K_b$ mode to generate a continuous printing path from the K-lines, using, by the processor of the computer device, a $L_a$ mode or a $L_b$ mode to generate another continuous printing path from the L-lines, selecting, by the processor of the computer device, an activation order of the $K_a$ mode or the $K_b$ mode and an activation order of the $L_a$ mode or the L; mode to control a texture morphology on surfaces of the target 3D model; and parametric control and outputting, comprising: performing, by the processor of the computer device, offset adjustment, spatial curve parameter adjustment and mode activation sequence adjustment, periodically switching, by the processor of the computer device, the activating order of the $K_a$ mode or the $K_b$ mode and the activating order of the $L_a$ mode or the $L_b$ mode to generate alternating textures, using, by the processor of the computer device, different spatial curves for an inner contour and an outer contour, outputting, by the processor of the computer device, geometric-codes (G-code) containing the continuous printing paths, and verifying, by the processor of the computer device, topological continuity, and outputting 3D printing path codes; and printing, by a 3D printer, an object with the 3D printing composite hollow structure based on the 3D printing path codes.

2. The method for generating the 3D printing composite hollow structure based on alternating connections of spatial curves as claimed in claim 1, wherein a geometric correspondence between the contour 1 and the contour 2 is determined by a contour division method and a point sampling method.

3. The method for generating the 3D printing composite hollow structure based on alternating connections of spatial curves as claimed in claim 2, wherein the spatial curves $f_i$ and $g_i$ are continuous curves generated by parameterized functions, and the continuous curves comprise at least one kind of the following: B-spline curves, trigonometric function curves, Bezier curves, conic sections, and polylines.

4. The method for generating the 3D printing composite hollow structure based on alternating connections of spatial curves as claimed in claim 3, wherein intersection points of the spatial curves with the contour 1 and the contour 2 of each of the layers are calculated and comprise the intersection points on the contour 1 of the n-th layer being $\{P_{n,i}\}$ and the intersection points on the contour 2 of the n-th layer being $\{Q_{n,i}\}$;

wherein the generating K-lines in the n-th layer comprises connecting the point $P_{n,i}$ with a point $Q_{n,i+k}$, where k is the preset offset;

wherein the generating L-lines in the (n+1)-th layer comprises connecting a point $Q_{n+1,i+k}$ to a point $P_{n+1,i+1}$, where l is the second offset.

5. The method for generating the 3D printing composite hollow structure based on alternating connections of spatial curves as claimed in claim 4, wherein a value of k satisfies a range of 1≤k≤10, and a value of l satisfies a range of 1≤l≤10, and the K-lines and the L-lines together form a cross-layer helical crossover network.

6. The method for generating the 3D printing composite hollow structure based on alternating connections of spatial curves as claimed in claim 5, wherein the K-L alternating connection path generation comprising:

generating the K-lines, including: in the n-th layer, connecting the point $P_{n,i}$ with the point $Q_{n,i+k}$, connecting a point $P_{n,i+1}$ with a point $Q_{n,i+k+1}$, and so on, to thereby generate the K-lines, where k is the preset offset;

generating the L-lines, including: in the (n+1)-th layer, connecting the point $Q_{n+1,i+k}$ to the point $P_{n+1,i+1}$, connecting a point $Q_{n+1,i+k+1}$ to a point $P_{n+1,i+l+1}$, and so on, to thereby generate the L-lines, where l is the preset second offset.

7. The method for generating the 3D printing composite hollow structure based on alternating connections of spatial curves as claimed in claim 6, wherein a mode activation sequence for the K-lines and the L-lines is cyclically switched as per a preset rule;

wherein during the using a $K_a$ mode or a $K_b$ mode to generate a continuous printing path from the K-lines:

the $K_a$ mode comprises: connecting the point $P_{n,i}$ to the point $P_{n,i+1}$ in sequence along the contour 1, and connecting the point $Q_{n,i+k+1}$ to a point $Q_{n,i+k+2}$ in sequence along the contour 2; and the $K_b$ mode comprises: connecting the point $Q_{n,i+k}$ to the point $Q_{n,i+k+1}$ in sequence along the contour 2, and connecting the point $P_{n,i+1}$ to a point $P_{n,i+2}$ in sequence along the contour 1;

wherein during the using a $L_a$ mode or a $L_b$ mode to generate another continuous printing path from the L-lines:

the $L_a$ mode comprises: connecting the point $P_{n+1,i+1}$ to the point $P_{n+1,i+l+1}$ in sequence along the contour 1, and connecting the point $Q_{n+1,i+k+1}$ to a point $Q_{n+1,i+k+2}$ in sequence along the contour 2; and the $L_b$ mode comprises: connecting the point $Q_{n+1,i+k}$ to the point $Q_{n+1,i+k+1}$ in sequence along the contour 2, and connecting the point $P_{n+1,i+l+1}$ to a point $P_{n+1,i+l+2}$ in sequence along the contour 1.

8. The method for generating the 3D printing composite hollow structure based on alternating connections of spatial curves as claimed in claim 7, wherein for the performing offset adjustment, spatial curve parameter adjustment and mode activation sequence adjustment and the generating differentiated surface textures, the differentiated surface textures comprise fish-scale patterns, woven patterns, and rhombic grids.

9. The method for generating the 3D printing composite hollow structure based on alternating connections of spatial curves as claimed in claim 8, wherein the parametric control and outputting comprises dynamically adjusting the values of k and l based on mechanical simulation results, and the value of k and the value of l are as follows:

in a high-stress area, k=l=1, thereby forming a dense connection;

in a low-stress areas, k≥3 or l≥3, thereby forming a sparse hollow structure.

* * * * *